United States Patent
Hachey (10) Patent No.: US 8,505,826 B2
(45) Date of Patent: Aug. 13, 2013

(54) ANTI-INTERROGATION FOR PORTABLE DEVICE

(75) Inventor: John Hachey, Elk Grove, CA (US)

(73) Assignee: Visa U.S.A., San Francisco, CA (US)

( * ) Notice: Subject to any disclaimer, the term of this patent is extended or adjusted under 35 U.S.C. 154(b) by 1420 days.

(21) Appl. No.: 11/735,794

(22) Filed: Apr. 16, 2007

(65) Prior Publication Data

US 2008/0256642 A1 Oct. 16, 2008

(51) Int. Cl.
*G06K 19/00* (2006.01)
(52) U.S. Cl.
USPC .... 235/492; 340/10.1; 340/572.1; 340/572.2; 340/572.3; 340/572.4; 340/572.5; 340/572.7
(58) Field of Classification Search
USPC ............................ 235/492; 340/10.1, 572.1
See application file for complete search history.

(56) References Cited

U.S. PATENT DOCUMENTS

| | | | |
|---|---|---|---|
| 4,353,064 A | 10/1982 | Stamm | |
| 4,818,973 A * | 4/1989 | Yamakawa et al. | 340/572.1 |
| 5,090,563 A | 2/1992 | Becker | |
| 5,288,942 A | 2/1994 | Godfrey | |
| 5,465,206 A | 11/1995 | Hilt et al. | |
| 5,477,038 A | 12/1995 | Levine et al. | |
| 5,500,513 A | 3/1996 | Langhans et al. | |
| 5,613,012 A | 3/1997 | Hoffman et al. | |
| 5,615,277 A | 3/1997 | Hoffman | |
| 5,621,201 A | 4/1997 | Langhans et al. | |
| 5,737,439 A | 4/1998 | Lapsley et al. | |
| 5,764,789 A | 6/1998 | Pare et al. | |
| 5,802,199 A | 9/1998 | Pare et al. | |
| 5,805,719 A | 9/1998 | Pare et al. | |
| 5,838,812 A | 11/1998 | Pare et al. | |
| 5,870,723 A | 2/1999 | Pare et al. | |
| 5,941,375 A | 8/1999 | Kamens et al. | |
| 5,982,914 A | 11/1999 | Lee et al. | |
| 6,012,039 A | 1/2000 | Hoffman et al. | |
| D425,873 S | 5/2000 | Anderson et al. | |
| 6,079,621 A | 6/2000 | Vardanyan et al. | |
| 6,121,544 A | 9/2000 | Petsinger | |
| 6,131,464 A | 10/2000 | Pare et al. | |
| 6,154,879 A | 11/2000 | Pare et al. | |

(Continued)

FOREIGN PATENT DOCUMENTS

| AU | 750154 B2 | 7/2002 |
|---|---|---|
| DE | 19740893 A1 | 3/1999 |

(Continued)

OTHER PUBLICATIONS

Extended European Search Report dated Apr. 27, 2010 from European Application No. 08799858.9, 7 pages.

(Continued)

*Primary Examiner* — Christopher Stanford
(74) *Attorney, Agent, or Firm* — Kilpatrick Townsend & Stockton LLP (57) ABSTRACT

A portable consumer device is disclosed. One or more contact regions in the portable consumer device may be provided on the contactless portable consumer device. The user may be required to place a finger on the one or more contact regions while holding the portable consumer device proximate to the interrogation device to enable it to be interrogated. The user's fingers may be used to electrically bridge an open portion of a circuit so as to enable operation of the portable consumer device.

31 Claims, 8 Drawing Sheets

(56) References Cited

U.S. PATENT DOCUMENTS

| | | |
|---|---|---|
| 6,192,142 B1 | 2/2001 | Pare et al. |
| 6,209,104 B1 | 3/2001 | Jalili |
| 6,230,148 B1 | 5/2001 | Pare et al. |
| 6,247,129 B1 | 6/2001 | Keathley et al. |
| 6,269,348 B1 | 7/2001 | Pare et al. |
| 6,366,682 B1 | 4/2002 | Hoffman et al. |
| 6,397,198 B1 | 5/2002 | Hoffman et al. |
| 6,411,728 B1 | 6/2002 | Lee et al. |
| 6,424,029 B1 | 7/2002 | Giesler |
| 6,560,581 B1 | 5/2003 | Fox et al. |
| 6,581,042 B2 | 6/2003 | Pare et al. |
| 6,588,660 B1 | 7/2003 | Buescher |
| 6,591,002 B2 | 7/2003 | Lee et al. |
| 6,594,376 B2 | 7/2003 | Hoffman et al. |
| 6,646,554 B1 | 11/2003 | Goff et al. |
| 6,662,166 B2 | 12/2003 | Pare et al. |
| 6,704,608 B1 | 3/2004 | Azuma |
| 6,728,397 B2 | 4/2004 | McNeal |
| 6,759,736 B2 | 7/2004 | Bohmer et al. |
| 6,830,193 B2 | 12/2004 | Tanaka |
| 6,837,425 B2 | 1/2005 | Gauthier et al. |
| 6,845,863 B1 | 1/2005 | Riley |
| 6,863,220 B2 * | 3/2005 | Selker ............ 235/492 |
| 6,879,966 B1 | 4/2005 | Lapsley et al. |
| 6,920,435 B2 | 7/2005 | Hoffman et al. |
| 6,920,611 B1 | 7/2005 | Spaeth et al. |
| 6,950,810 B2 | 9/2005 | Lapsley et al. |
| 6,957,770 B1 | 10/2005 | Robinson |
| 6,980,670 B1 | 12/2005 | Hoffman et al. |
| 6,985,608 B2 | 1/2006 | Hoffman et al. |
| 7,004,389 B1 | 2/2006 | Robinson et al. |
| 7,007,840 B2 | 3/2006 | Davis |
| 7,039,611 B2 | 5/2006 | Devine |
| 7,051,923 B2 | 5/2006 | Nguyen et al. |
| 7,082,415 B1 | 7/2006 | Robinson et al. |
| 7,098,794 B2 * | 8/2006 | Lindsay et al. ............ 340/572.3 |
| 7,104,446 B2 | 9/2006 | Bortolin et al. |
| 7,121,456 B2 | 10/2006 | Spaeth et al. |
| 7,124,937 B2 | 10/2006 | Myers et al. |
| 7,152,045 B2 | 12/2006 | Hoffman |
| 7,152,780 B2 | 12/2006 | Gauthier et al. |
| 7,185,807 B1 | 3/2007 | Robinson et al. |
| 7,243,853 B1 | 7/2007 | Levy et al. |
| 7,248,719 B2 | 7/2007 | Hoffman et al. |
| 7,269,737 B2 | 9/2007 | Robinson |
| 7,280,981 B2 | 10/2007 | Huang et al. |
| 7,319,987 B1 | 1/2008 | Hoffman et al. |
| 7,367,049 B1 | 4/2008 | Robinson et al. |
| 7,387,240 B2 | 6/2008 | Ziegler |
| 7,389,269 B1 | 6/2008 | Robinson et al. |
| 7,437,330 B1 | 10/2008 | Robinson et al. |
| 7,464,059 B1 | 12/2008 | Robinson et al. |
| 7,482,925 B2 | 1/2009 | Hammad |
| 7,483,862 B1 | 1/2009 | Robinson et al. |
| 7,497,372 B1 | 3/2009 | Robinson et al. |
| 7,502,761 B2 | 3/2009 | Siegal et al. |
| 7,512,567 B2 | 3/2009 | Bemmel et al. |
| 7,522,905 B2 | 4/2009 | Hammad |
| 7,526,652 B2 | 4/2009 | Ziegler |
| 7,533,066 B1 | 5/2009 | Robinson et al. |
| 7,533,809 B1 | 5/2009 | Robinson et al. |
| 7,536,352 B2 | 5/2009 | Lapsley et al. |
| 7,542,590 B1 | 6/2009 | Robinson et al. |
| 7,545,621 B2 | 6/2009 | Haddad |
| 7,558,406 B1 | 7/2009 | Robinson et al. |
| 7,558,407 B2 | 7/2009 | Hoffman et al. |
| 7,565,329 B2 | 7/2009 | Lapsley et al. |
| 7,606,401 B2 | 10/2009 | Hoffman et al. |
| 7,613,659 B1 | 11/2009 | Hoffman et al. |
| 7,620,605 B2 | 11/2009 | Hoffman et al. |
| 7,624,073 B1 | 11/2009 | Robinson et al. |
| 7,631,193 B1 | 12/2009 | Hoffman |
| 7,698,567 B2 | 4/2010 | Hoffman |
| 7,747,528 B1 | 6/2010 | Robinson et al. |
| 7,765,164 B1 | 7/2010 | Robinson et al. |
| 7,769,695 B2 | 8/2010 | Robinson et al. |
| 7,778,933 B2 | 8/2010 | Robinson et al. |
| 7,831,468 B1 | 11/2010 | Conte et al. |
| 7,836,485 B2 | 11/2010 | Robinson et al. |
| 7,882,032 B1 | 2/2011 | Hoffman |
| 7,970,678 B2 | 6/2011 | Lapsley |
| 8,015,118 B1 | 9/2011 | Robinson et al. |
| 8,145,191 B2 | 3/2012 | Hammad |
| 2002/0031997 A1 | 3/2002 | Lawler, Jr. et al. |
| 2002/0116330 A1 | 8/2002 | Hed et al. |
| 2003/0030542 A1 | 2/2003 | von Hoffmann |
| 2003/0116634 A1 | 6/2003 | Tanaka |
| 2003/0132301 A1 * | 7/2003 | Selker ............ 235/487 |
| 2004/0073510 A1 | 4/2004 | Logan et al. |
| 2004/0196605 A1 * | 10/2004 | Dinn et al. ............ 361/91.1 |
| 2006/0106734 A1 | 5/2006 | Hoffman |
| 2006/0265602 A1 | 11/2006 | Robinson |
| 2007/0162337 A1 | 7/2007 | Hawkins |
| 2007/0282677 A1 | 12/2007 | Carpenter |
| 2007/0288319 A1 | 12/2007 | Robinson |
| 2007/0288320 A1 | 12/2007 | Cooper |
| 2008/0097851 A1 | 4/2008 | Bemmel |
| 2008/0147481 A1 | 6/2008 | Robinson |
| 2008/0271116 A1 | 10/2008 | Robinson et al. |
| 2008/0303632 A1 | 12/2008 | Hammad |
| 2009/0070270 A1 | 3/2009 | Robinson et al. |
| 2009/0074256 A1 | 3/2009 | Haddad |
| 2009/0088229 A1 | 4/2009 | Hammad |
| 2009/0099944 A1 | 4/2009 | Robinson |
| 2009/0138366 A1 | 5/2009 | Bemmel |
| 2009/0146814 A1 | 6/2009 | Hammad |
| 2009/0177587 A1 | 7/2009 | Siegal |
| 2009/0228362 A1 | 9/2009 | Lapsley |

FOREIGN PATENT DOCUMENTS

| | | |
|---|---|---|
| DE | 19742126 A1 | 3/1999 |
| DE | 10016716 A1 | 8/2001 |
| FR | 2828953 A1 | 2/2003 |
| GB | 2407189 A | 4/2005 |
| JP | 2003228693 A | 8/2003 |
| JP | 2007041817 A | 2/2007 |
| WO | WO 96/36934 A1 | 11/1996 |
| WO | WO 98/09227 A1 | 3/1998 |
| WO | WO 98/15924 A1 | 4/1998 |
| WO | WO 98/41947 A1 | 9/1998 |
| WO | WO 99/31621 A1 | 6/1999 |
| WO | WO 00/26849 A1 | 5/2000 |
| WO | WO 00/45247 A1 | 8/2000 |
| WO | WO 00/45320 A1 | 8/2000 |
| WO | WO 00/46710 A1 | 8/2000 |
| WO | WO 00/46737 A1 | 8/2000 |
| WO | WO 00/67187 A1 | 11/2000 |
| WO | WO 01/06440 A1 | 1/2001 |
| WO | WO 01/20531 A1 | 3/2001 |
| WO | WO 02/14984 A2 | 2/2002 |
| WO | WO 2006/138440 A2 | 12/2006 |
| WO | WO 2007/092715 A2 | 8/2007 |
| WO | WO 2008/002979 A2 | 1/2008 |

OTHER PUBLICATIONS

Office Action dated Jun. 5, 2012 in Chinese Application No. 200880016683.2, 3 pages.
Examiner's first report on Australian Patent Application No. 2005243012, mailed Apr. 2, 2012, 2 pages total.
U.S. Appl. No. 10/678,646, filed Oct. 6, 2003 (31 pages).
Office Action mailed Sep. 14, 2012 in Japanese Patent Application No. 2010-504188, 4 pages.

* cited by examiner

ANTI-INTERROGATION FOR PORTABLE DEVICE

BACKGROUND

Embodiments of the present invention relate to systems and methods for preventing portable consumer devices such as contactless smart cards from being wirelessly interrogated.

Generally, contactless portable consumer devices such as smart cards, key fobs, radio frequency identification devices (RFID), cellular phones, etc. are designed to provide the consumer with a way to engage in wireless communication using radio frequency (RF) signals.

Because contactless portable consumer devices can operate without wires, such devices are expected to replace other types of devices that require physical contact or physical connections to communicate with other devices and systems. A major benefit of contactless portable consumer devices is that they do not have to be removed from a consumer's wallet, briefcase, backpack, or purse to be used.

Unfortunately, due to the wireless nature of the contactless portable consumer devices, it is entirely possible that a contactless reader may be used for surreptitious interrogation (e.g., data skimming) of the contactless devices.

As theft of sensitive information using wireless interrogation of contactless devices is a major concern for consumers and businesses alike, law enforcement agencies are actively seeking ways to discover when such activity is taking place. Unfortunately, given the sophistication of the wireless interrogation equipment and the nature of wireless signals, unauthorized wireless interrogation can occur.

Embodiments of the invention address these and other embodiments individually and collectively.

BRIEF SUMMARY

Embodiments of the invention prevent a contactless portable consumer device such as a smartcard, RFID, key FOB, tag, and the like from being wireless interrogated by an unauthorized interrogation device.

In one aspect, an embodiment of the present invention relates to a portable consumer device configured to enable wireless communication with an interrogation device. The portable consumer device includes a memory for storing information such as financial information, a transmitting antenna such as a near field transmitting antenna coupled to the memory, and a contact region coupled to the transmitting antenna. The transmitting antenna is capable of transmitting the information to an interrogation device when the finger is on the contact region.

In another aspect, an embodiment of the present invention relates to a system that includes an interrogation device and a portable consumer device. The portable consumer device includes a memory for storing information, a transmitting antenna coupled to the memory, and a contact region coupled to the transmitting antenna. The transmitting antenna is capable of being activated when a finger is on the contact region and when the portable consumer device is proximate to the interrogation device.

In another aspect, an embodiment of the invention relates to a method of providing secure wireless communication with an interrogation device. A portable consumer device is provided that includes a memory for storing information, a transmitting antenna coupled to the memory, and a contact region coupled to the transmitting antenna. A consumer is allowed to place the portable consumer device proximate to the interrogation device. The portable consumer device is configured to activate the transmitting antenna only when the consumer places a finger on the contact region while the portable consumer device is proximate to the interrogation device.

These and other embodiments of the invention are described in further detail below.

DETAILED DESCRIPTION

Embodiments of the present invention allow wireless communication between a portable consumer device that includes stored information, and an interrogation device. In embodiments of the invention, one or more contact regions may be provided on the portable consumer device that control whether the device can be interrogated for its stored information. To enable interrogation of the portable consumer device, a user such as a consumer may be required to place a finger on a contact region while the portable consumer device is proximate to the interrogation device. If the consumer's finger is not on the contact region, the portable consumer device cannot be interrogated with an interrogation device.

The portable consumer devices according to embodiments of the present invention are capable of wireless or contactless communication with an interrogation device. They may include one or more antennas that transmit and receive signals and data through a wireless or contactless communication medium.

An exemplary portable consumer device and an exemplary interrogation device preferably communicate using a Near Field Communication or NFC technology. NFC technology utilizes a very short range (e.g., usually less than 10 inches) two-way wireless connectivity, and is a short-range radio frequency (RF) technology that allows an interrogation device such as a reader to read small amounts of data when the portable consumer device is near the interrogation device.

A portable consumer device using NFC technology uses electromagnetic induction to cause the portable consumer device to transmit information stored in it. A typical portable consumer device using a typical NFC technology contains at least a small processor and a transmitting antenna which is typically in the form of a wire loop. When the portable consumer device is close to an interrogation device with an interrogation signal (e.g., an RF signal) such as an electromagnetic field, the wire loop enters the terminal's field, causing induction in the wire loop. The voltage generated by the induction powers the processor. Once the portable consumer device is activated, the processor then transmits information stored in the memory in the portable consumer device to the terminal at a predetermined frequency (e.g., 13.56 MHz) using the wire loop. Instruction sets built into the processor may also encrypt the data during transmission.

This above-described process is referred to as inductive coupling and the portable consumer device may be characterized as "batteryless" as no internal source of power is required to power the processor. This type of system can be characterized as a passive system since active powering of the processor is not present.

The portable consumer devices may be of any suitable form. For example, the portable consumer devices may be portable consumer devices and may be hand-held and compact so that they can fit into a consumer's wallet or pocket (e.g., pocket-sized). They may be used for the payment for goods or services, money transfers, or gaining access to places (e.g., access badges). The portable consumer devices may include smartcards, ordinary credit or debit cards (with a magnetic strip and without a microprocessor), keychain devices (such as the Speedpass device commercially available from Exxon-Mobil Corp.), key fobs, cellular phones, personal digital assistants (PDAs), pagers, payment cards, security cards, access cards, smart media, transponders, and the like.

An exemplary portable consumer device may include a memory such as one or more memory chips and/or a memory cache in a microprocessor. Either may be operationally coupled to the transmitting antenna of the portable consumer device.

The memory may comprise computer-readable media (i.e., signal-bearing medium), and may be in the form of volatile and non-volatile memory devices including RAMs, ROMs, EEPROMs, magnetic strips, etc. The computer readable media may include computer code representing the information described below.

The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

If the portable consumer device is in the form of a debit, credit, or smartcard, the portable consumer device may also optionally have features such as magnetic strips. Such devices can operate in either a contact or contactless mode.

The portable consumer device of the present invention may be used with authorized interrogation devices (e.g., authorized readers) that may also have antennas and signal generators. Such authorized interrogation devices may be present at point of sale (POS) terminals, ATM (automatic teller machines), and the like. Such interrogation devices may be used to wirelessly read information stored on the portable consumer device memory or to write information onto the same.

Figure 1:
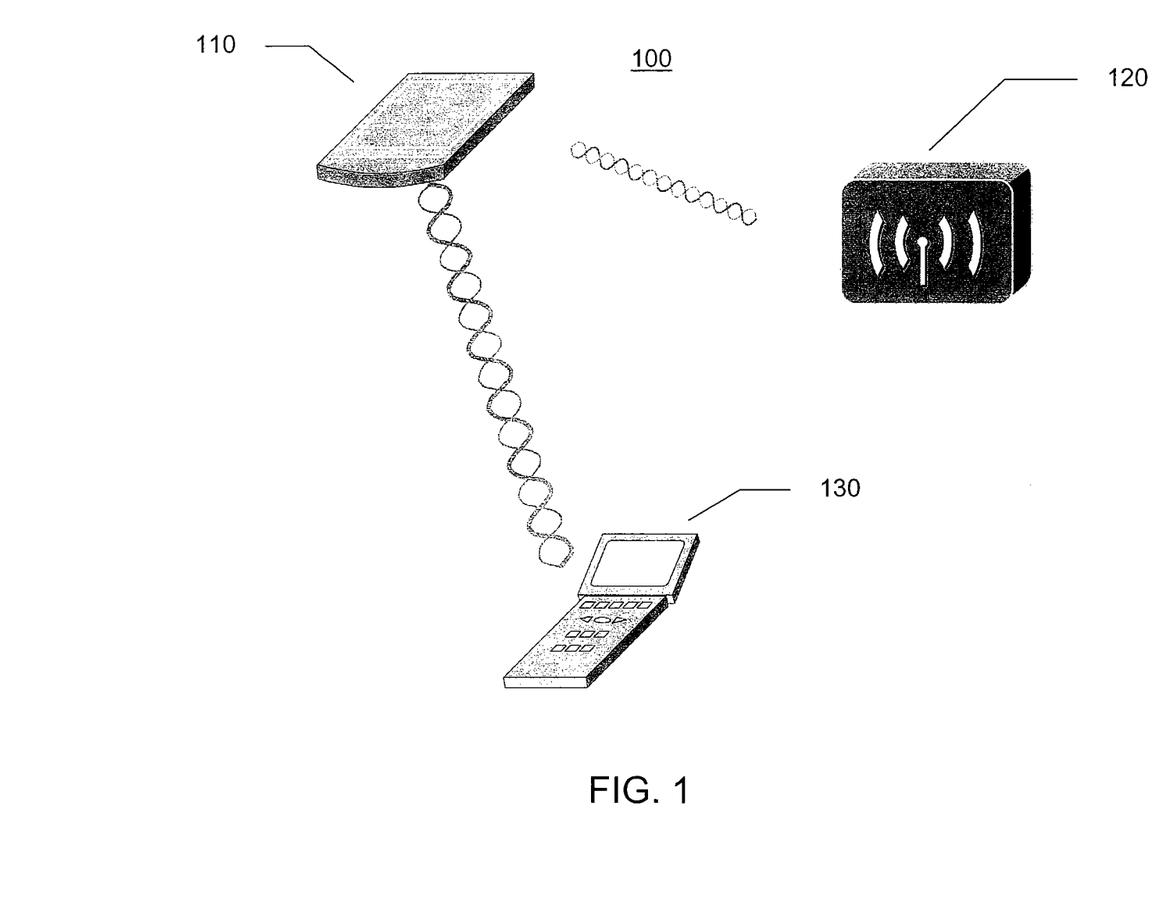
FIG. 1 shows a system that illustrates the security risks of contactless portable consumer devices.

FIG. 1 shows a wireless communication system 100 that illustrates the security issues currently associated with contactless portable consumer devices. In particular, portable consumer device 110 may be interrogated by an authorized interrogation device 120. However, it can also unfortunately be interrogated by the unauthorized interrogation device 130. There is a need to prevent interrogation of portable consumer devices with unauthorized interrogation devices.

Figure 2:
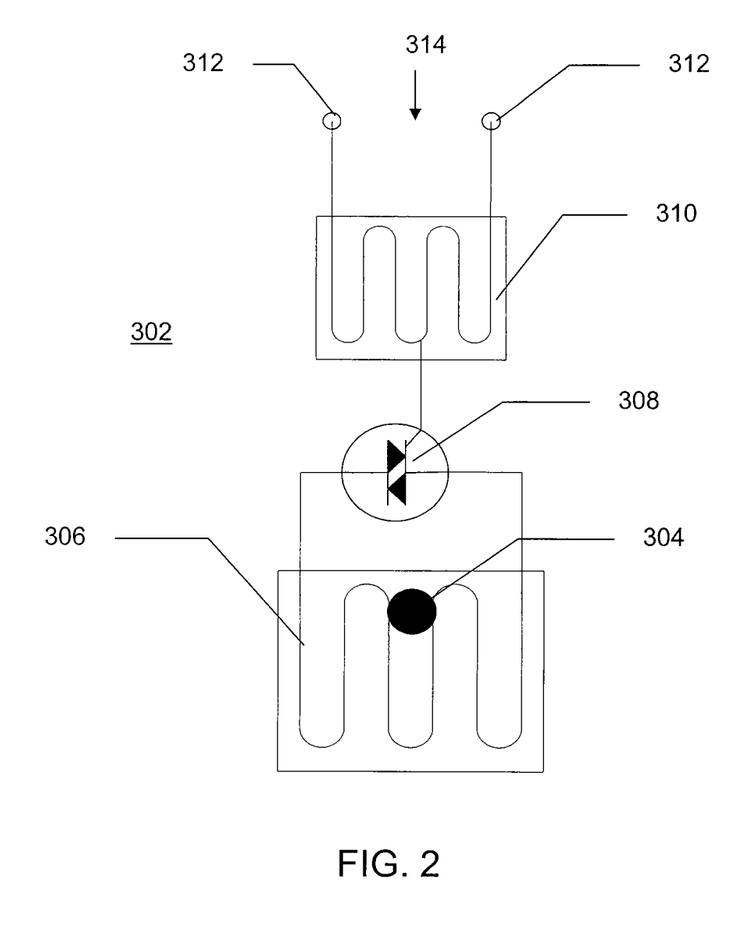
FIG. 2 shows an exemplary circuit diagram according to an embodiment of the invention.

FIG. 2 is a schematic representation of a contactless portable consumer device 302 in accordance with one embodiment of the present invention. Portable consumer device 302 includes a processor 304 (e.g., a microprocessor which may include a memory) and a transmitting antenna 306. In embodiments of the invention, the transmitting antenna 306 may transmit electromagnetic signals to an interrogation device (not shown), and it may also receive interrogation signals from the interrogation device.

The circuit including the transmitting antenna 306 includes a triggering electronic component 308. A trigger antenna 310 is coupled to the triggering component 308 and includes a contact region including an open portion 314 of a circuit and two electrical contact points 312.

Although the contact region in this example, is in the form of two exposed electrical contacts separated from each other, the contact region could be in the other forms in other embodiments of the invention (e.g., a pressure switch, a piezo electric device, a bubble switch, etc.). A contact region including two exposed electrical contacts is preferred, since this type of contact region does not require any moving parts and is less complicated to manufacture than a portable consumer device with a mechanical switch. It is also less prone to failure than a mechanical switch, since there are no moving parts.

Triggering electronic component 308 may be, for example, a silicon controlled rectifier (SCR), a triode for alternating current (TRIAC), or a MOSFET. Component 308 may be triggered by changes in current or voltage in trigger antenna circuit 310. Before the component 308 is triggered, no current passes through the component 308, and the circuit of the transmitting antenna 306 is broken at the location of component 308. Therefore, before component 308 is triggered, the transmitting antenna is inoperative even if an appropriate interrogation signal from an interrogation device is present.

Once component 308 is triggered, the circuit of the transmitting antenna 306 becomes complete and the antenna becomes operational. That is, a current may now be induced in the completed circuit of the antenna 306 by a magnetic field. The induced current may then power the processor 308, which generates a return signal which is transmitted to the interrogation device by the transmitting antenna 306.

In order to trigger the trigger electronic component 308, the broken circuit of the trigger antenna 310 is completed. In particular, open portion 314 exists in the trigger antenna circuit 310 between contact points 312. In order to trigger component 308, this open portion 314 is bridged by a material (e.g., a finger) that is sufficiently conductive to enable some current induction in the trigger antenna circuit 310 when an interrogation signal from an interrogation device is present. The current induced in the trigger antenna circuit by an external magnetic field need only be sufficient to trigger the trigger electronic component 308, which may be highly sensitive to changes in current or voltage.

Figure 3:
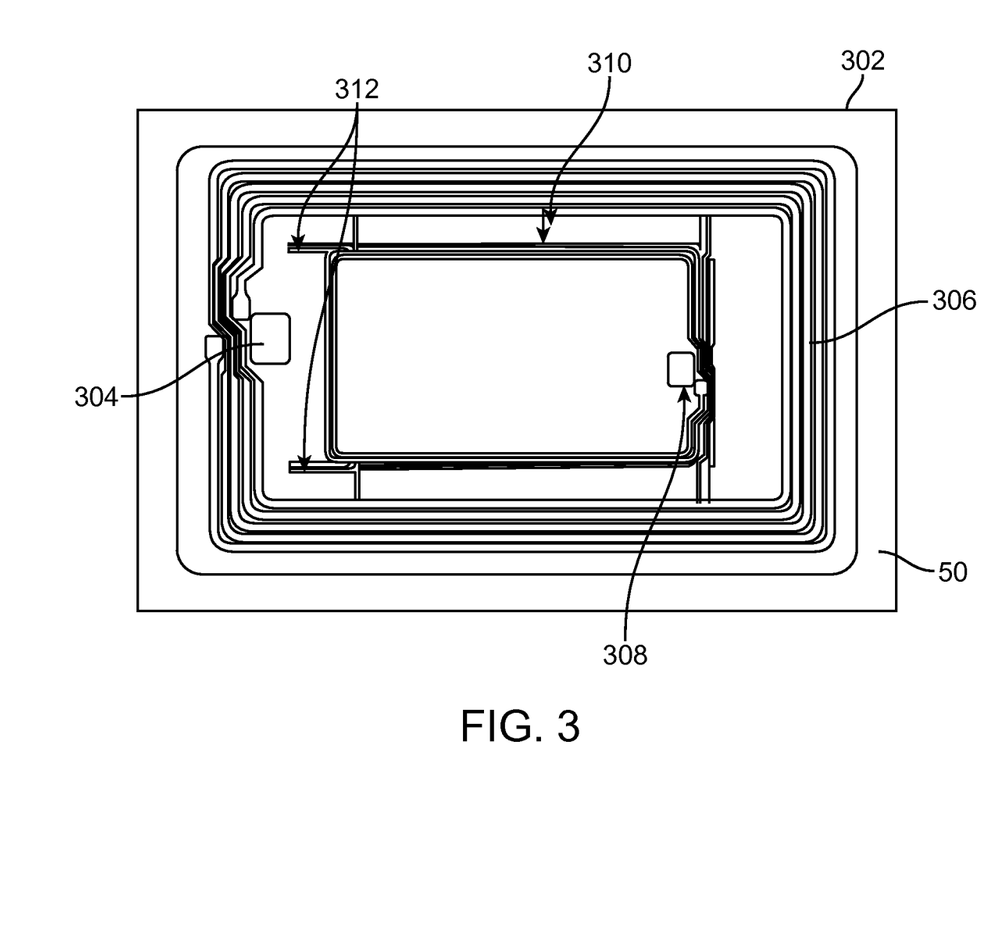
FIG. 3 shows a circuit layout in a portable consumer device.

FIG. 3 shows a layout implementing the schematic diagram set forth in FIG. 2. The same reference numerals from FIG. 2 are used in FIG. 3 to refer to equivalent parts. As shown, the transmitting antenna 306 can be in the form of a larger coil of wire which can extend around the periphery of the portable consumer device 302, while the trigger antenna 310 can be in the form of a smaller coil of wire that is in the larger coil of wire. Also, as shown in FIG. 3, the trigger antenna 310, the transmitting antenna 306, as well as the components 304, 308, may be mounted on a plastic substrate 50.

Figure 4:
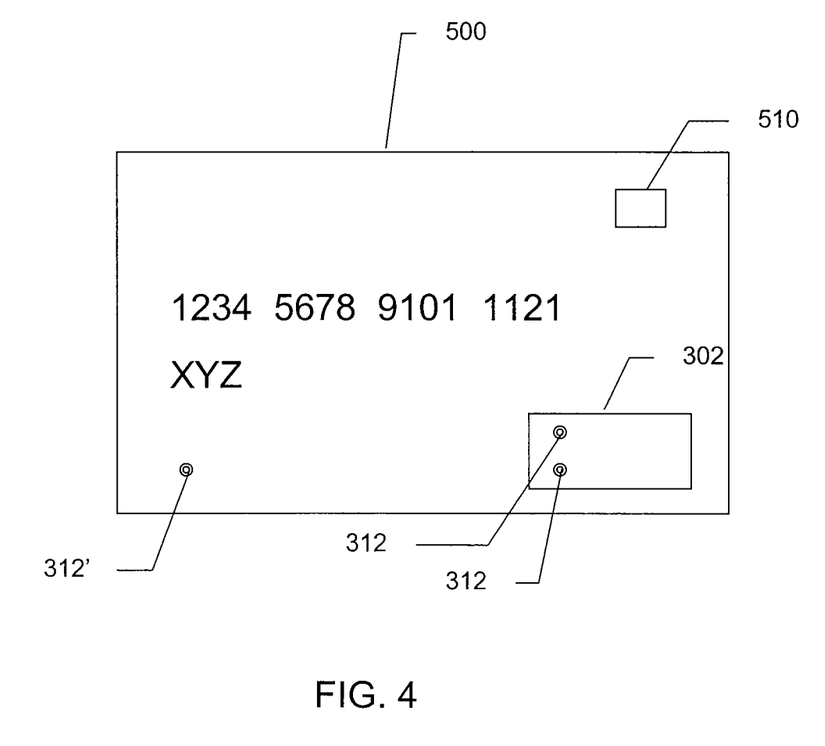
FIGS. 4 and 5 show external views of contactless cards according to embodiments of the present invention.

In one approach, the open portion 314 may be bridged using one or more fingers of the consumer's hand. For example, as shown in FIG. 4, the portable consumer device 302 may be a credit card 500, which has two contact points 312. They may be spaced relatively close to each other in the contact region such that a single fingertip may contact both points 312 and bridge the open portion 314. The contact region in which the contact points 312 are situated may be indicated to the consumer by using graphics or other indicia (e.g., a logo, hologram, etc.). Although finger tissue is not highly conductive, it is sufficiently conductive to enable a small current to be induced within the trigger circuit 310 when the finger is placed across the contact points 312 and an interrogation signal is received from the interrogation device. The consumer's fingers can cover the contact points 312 by simply grasping the portable consumer device in the manner that he normally grasps it.

Figure 5:
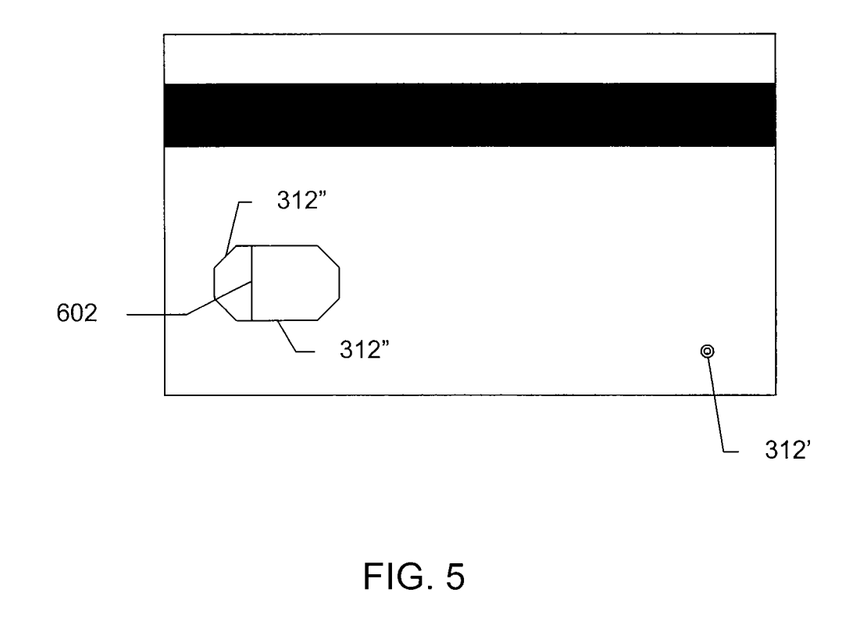

In another example illustrated by FIGS. 4-5, which show the front and back of a card 500, contact points 312, 312' may be disposed on opposite sides of card 500 such that each point is configured to be contacted by a finger tip when the consumer holds the card 500 between two fingers.

Figure 6:
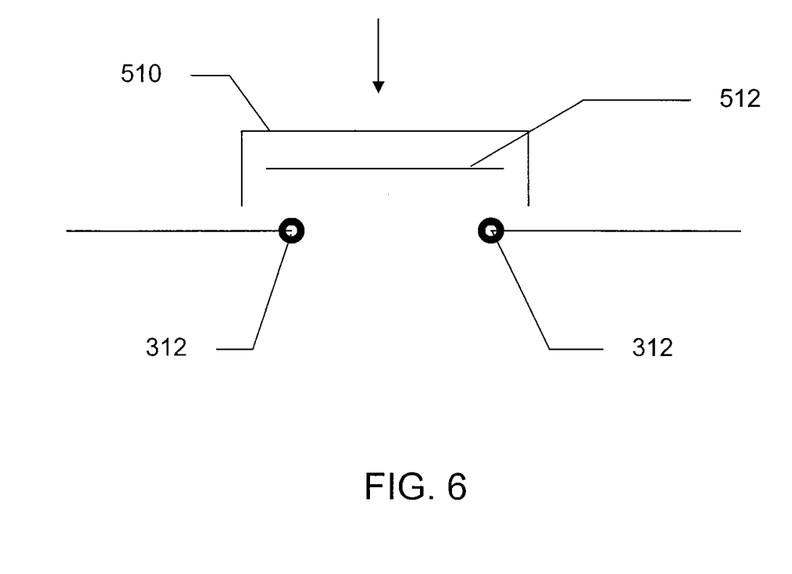
FIG. 6 is a schematic representation of a pressure switch for bridging the open portion of a circuit.

In another example illustrated by FIG. 5, contact points 312" may be formed as a thin layer of conductive material separated by a microfracture 602. FIG. 6 also shows another contact point 312' which may or may not be used with the microfracture 602.

In an alternative approach, the open portion 314 may be bridged using a switch or other suitable electromechanical device. For example, as shown in FIG. 6, pressure switch 510 may be provided for consumer activation of the portable consumer device. In particular, as illustrated in FIG. 6, switch 510 may be disposed between the two contact points 312 such that when the consumer presses down on switch 510, electrically conductive contact element 512 bridges the contact points 312. Switch 510 may be spring loaded or otherwise biased to make contact only when the consumer is pressing down on switch 510.

Figure 7:
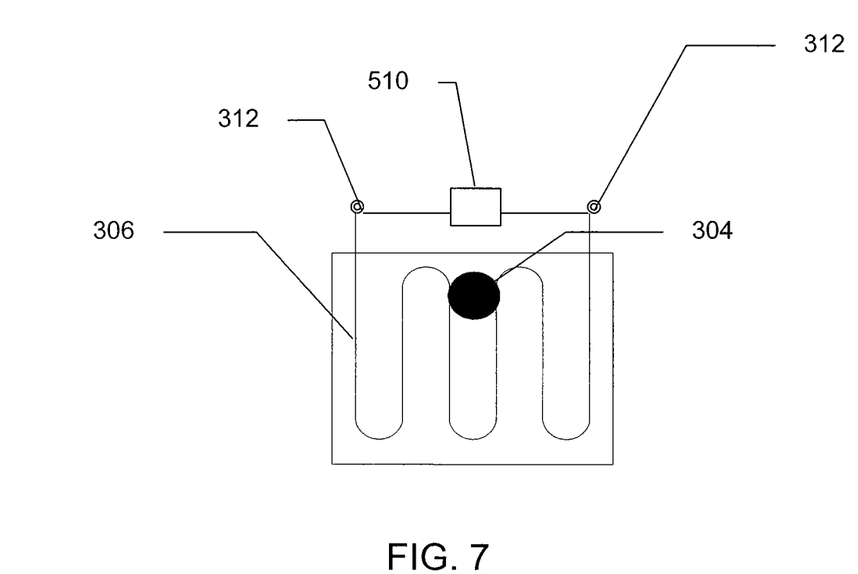
FIG. 7 shows a circuit diagram according to another embodiment.

In another approach illustrated by FIG. 7, contact points 312 and open portion 314 may be included within the transmitting antenna circuit 306. For example, pressure switch 510 (or other activation component) may be disposed between the two contact points 312 and may directly complete antenna circuit 306 when the consumer applies pressure to the switch. In this embodiment, a trigger antenna is not needed.

Figure 8:
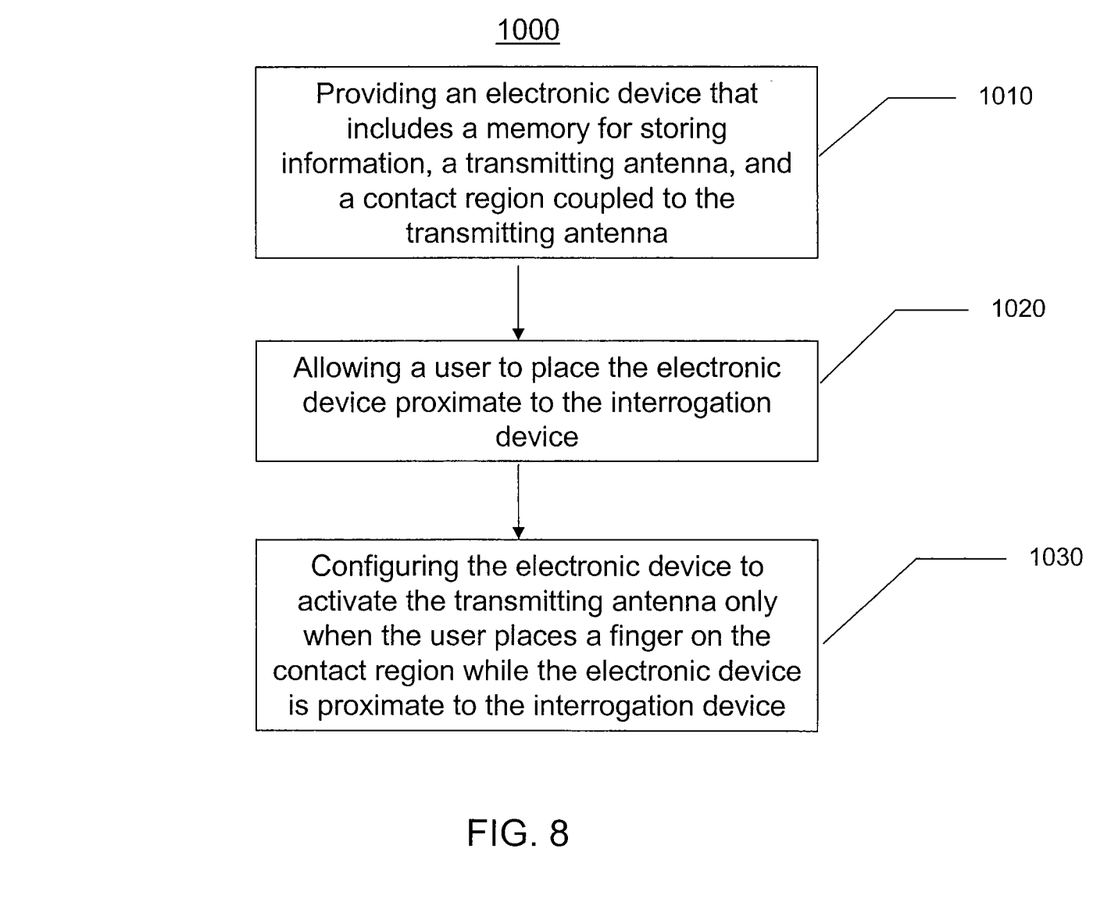
FIG. 8 is a flow diagram illustrating a method in accordance with the present invention.

FIG. 8 is a flow diagram illustrating a method 1000 for providing secure wireless communication with an interrogation device. The method may be entered into at step 1010, at which a portable consumer device is provided that includes a memory for storing information, a transmitting antenna, and a contact region coupled to the transmitting antenna. For example, a credit card issuer may provide a consumer with a portable consumer device configured for secure contactless communication. At step 1020, a consumer is allowed to place the portable consumer device proximate to the interrogation device. For example, a consumer may be allowed to place the portable consumer device proximate to an authorized interrogation device at a POS terminal, which may emit an interrogation signal for powering and communicating with the device. At step 1030, the portable consumer device is configured to activate the transmitting antenna only when the consumer places a finger on the contact region while the portable consumer device is proximate to the interrogation device. For example, the consumer's finger may electrically bridge an open portion in a trigger antenna circuit, enabling a current to be induced within the trigger antenna circuit, and thereby triggering an electronic component that completes the circuit of the transmitting antenna. In another example, the consumer's finger may apply pressure or otherwise actuate a switch that directly bridges an open portion of the transmitting antenna circuit. In another example, the consumer's finger applies pressure to a piezoelectric device, which generates current that triggers the electronic component.

The above-described portable consumer devices may be made using any suitable method. In one method, a portable consumer device can be made by first forming a transmitting antenna, and optionally a trigger antenna, on a substrate. The substrate may be a insulating plastic substrate like those typically used in a payment card such as a credit card. Metal patterns can be formed on the substrate using conventional circuit printing processes.

Before or after the transmitting antenna and optional trigger antenna are formed on the substrate, a memory may be coupled to the transmitting antenna. The memory may be present in the form of one or more chips which may be mounted (using standard chip mounting processes) on the substrate, so that the one or more chips are electrically coupled to the transmitting antenna. As noted above, the memory may also be in the form of a microprocessor chip with an internal memory. If present, a triggering electronic component may also be formed or mounted on the substrate, proximate to the triggering antenna.

A contact region, as described above, can be also formed on the substrate. This can simply be in the form of two spaced apart contacts which are formed during the formation of the trigger antenna. Or, the contact region could be in the form of a switch that is attached to the portions of the triggering antenna. The size of the contact region may be less than about 1 square inch, or may be the size of an adult's finger in embodiments of the invention.

If desired, an additional cover insulating sheet may then be laminated to or deposited on the substrate so that the antenna and memory are sandwiched between the sheet and the substrate. The exposed contacts of the contact region may be exposed through the insulating sheet so that a consumer's finger can make contact with the contact region as described above.

The formed portable consumer device is capable of transmitting the stored information to an interrogation device using the transmitting antenna when a finger is on the contact region, but is not capable of transmitting the stored information to the interrogation device using the transmitting antenna when the finger is not on the contact region.

Embodiments of the invention have a number of advantages. When a consumer places his finger on the above-described contact region of a portable consumer device, the consumer makes a conscious decision to allow the portable consumer device to be interrogated. The portable consumer device cannot be successfully interrogated when the consumer's finger is not present on the contact region. Accordingly, information in the portable consumer device can be retrieved when the consumer wants it to be transmitted, but cannot be retrieved when the consumer does not want the information to be transmitted. In addition, embodiments of the invention are relatively easy to manufacture.

It is apparent to one skilled in the art that various changes and modifications can be made to this disclosure, and equivalents employed, without departing from the spirit and scope of the invention. Elements shown with any embodiment are exemplary for the specific embodiment and can be used on other embodiments within this disclosure.

What is claimed is:

1. A portable consumer device comprising:
a memory for storing information;
a near field transmitting antenna coupled to the memory;
a contact region coupled to the near field transmitting antenna, wherein the portable consumer device is capable of transmitting the stored information to an interrogation device using the near field transmitting antenna when a finger is on the contact region, but is not capable of transmitting the stored information to the interrogation device using the near field transmitting antenna when the finger is not on the contact region, wherein the contact region comprises an open portion of a circuit and two spaced apart contact points that are exposed on an outer surface of the portable consumer device, the exposed contact points capable of being bridged by the finger; and
a trigger antenna coupled to the two spaced apart contact points of the contact region and capable of enabling activation of the transmitting antenna.

2. The portable consumer device of claim 1, wherein at least part of the contact region forms at least part of the trigger antenna.

3. The portable consumer device of claim 2, wherein the near field transmitting antenna comprises a triggering electronic component that is capable of being triggered to enable activation of the transmitting antenna.

4. The portable consumer device of claim 3, further comprising at least part of the trigger antenna coupled to the triggering electronic component.

5. The portable consumer device of claim 3, wherein the triggering electronic component comprises at least one of a silicon controlled rectifier (SCR), a triode for alternating current (TRIAC), or a metal-oxide-semiconductor field-effect transistor (MOSFET).

6. The portable consumer device of claim 4, wherein current in the trigger antenna is induced when the finger is on the contact region and the portable consumer device is proximate to the interrogation device.

7. The portable consumer device of claim 6, wherein the portable consumer device is a payment card.

8. The portable consumer device of claim 7, wherein the two electrical contacts are located on opposite sides of the portable consumer device.

9. The portable consumer device of claim 1, wherein the portable consumer device is capable of being interrogated by an interrogation signal generated by the interrogation device.

10. The portable consumer device of claim 1, wherein the portable consumer device comprises one of a payment card, a key fob, and a cellular phone.

11. The portable consumer device of claim 1, wherein the portable consumer device is batteryless.

12. A system comprising:
the interrogation device; and
the portable consumer device of claim 1 in communication with the interrogation device.

13. The portable consumer device of claim 1, wherein the open portion is included within a near field transmitting antenna circuit, such that the finger completes the transmitting antenna circuit when bridging the two spaced apart contact points.

14. The portable consumer device of claim 1, wherein the memory is a microprocessor chip comprising an internal memory.

15. The portable consumer device of claim 1, wherein the open portion of the circuit is an open portion of the trigger antenna.

16. A portable consumer device, wherein the portable consumer device is a payment card comprising:
a memory for storing information;
a near field transmitting antenna couple to the memory, wherein the near field transmitting antenna comprises a triggering electronic component that is capable of being triggered to enable activation of the transmitting antenna;
a contact region coupled to the near field transmitting antenna, wherein the portable consumer device is capable of transmitting the stored information to an interrogation device using the near field transmitting antenna when a finger is on the contact region, but is not capable of transmitting the stored information to the interrogation device using the near field transmitting antenna when the finger is not on the contact region, wherein the contact region comprises an open portion of a circuit;
a trigger antenna, wherein at least part of the trigger antenna is coupled to the triggering electronic component, and wherein at least part of the contact region forms at least part of the trigger antenna, the contact region comprising two spaced apart contacts points that are exposed on an outer surface of the portable consumer device, wherein the two exposed contact points are located on the same side of the portable consumer device, wherein the trigger antenna is coupled to the two spaced apart contact points of the contact region, and wherein current in the trigger antenna is induced when the finger is on the contact region and the portable consumer device is proximate to the interrogation device.

17. A method of using a portable consumer device, the method comprising:
obtaining the portable consumer device, the portable consumer device comprising a memory for storing information, a near field transmitting antenna coupled to the memory, a trigger antenna, and a contact region coupled to the near field transmitting antenna, wherein the portable consumer device is capable of transmitting the stored information to an interrogation device using the near field transmitting antenna when a finger is on the contact region, but is not capable of transmitting the stored information to the interrogation device using the near field transmitting antenna when the finger is not on the contact region, wherein the contact region comprises an open portion of a circuit and two spaced apart contact points that are exposed on an outer surface of the portable consumer device, the exposed contact points capable of being bridged by the finger, and wherein the trigger antenna is coupled to the two spaced apart contact points of the contact region and capable of enabling activation of the transmitting antenna;
placing the finger on the contact region; and
placing the portable consumer device near the interrogation device.

18. The method of claim 17 wherein the portable consumer device is placed within about 10 inches or less of the interrogation device.

19. A method for forming a portable consumer device comprising:
attaching a memory for storing information to a substrate;
forming a near field transmitting antenna on the substrate, wherein the near field transmitting antenna is coupled to the memory in the portable consumer device;

forming a contact region on the substrate, wherein the contact region is coupled to the near field transmitting antenna in the portable consumer device, wherein the contact region comprises an open portion of a circuit and two spaced apart contact points that are exposed on an outer surface of the portable consumer device, the exposed contact points capable of being bridged by a finger; and forming a trigger antenna on the substrate, wherein the trigger antenna is coupled to the two spaced apart contact points of the contact region and capable of enabling activation of the transmitting antenna, wherein the portable consumer device is capable of transmitting the stored information to an interrogation device using the near field transmitting antenna when the finger is on the contact region, but is not capable of transmitting the stored information to the interrogation device using the near field transmitting antenna when the finger is not on the contact region.

20. The method of claim 19, further comprising laminating or depositing an insulating sheet on the substrate.

21. A portable consumer device comprising:
a memory for storing financial information;
a transmitting antenna coupled to the memory;
a contact region coupled to the transmitting antenna, wherein the portable consumer device is capable of transmitting the stored financial information to an interrogation device using the transmitting antenna when a finger is on the contact region, but is not capable of transmitting the stored information to the interrogation device using the transmitting antenna when the finger is not on the contact region, wherein the contact region comprises an open portion of a circuit and two spaced apart contact points that are exposed on an outer surface of the portable consumer device, the exposed contact points capable of being bridged by a finger; and
a trigger antenna coupled to the two spaced apart contact points of the contact region and capable of enabling activation of the transmitting antenna.

22. The portable consumer device of claim 21 wherein the portable consumer device is a cell phone or contactless payment card.

23. A system comprising:
the portable consumer device of claim 21; and
the interrogation device in communication with the portable consumer device.

24. The portable consumer device of claim 21, wherein the open portion of the circuit is an open portion of the trigger antenna.

25. A method of using a portable consumer device, the method comprising:
obtaining the portable consumer device, the portable consumer device comprising a memory for storing financial information, a transmitting antenna coupled to the memory, a trigger antenna, and a contact region coupled to the transmitting antenna, wherein the portable consumer device is capable of transmitting the stored financial information to an interrogation device using the transmitting antenna when a finger is on the contact region, but is not capable of transmitting the stored information to the interrogation device using the transmitting antenna when the finger is not on the contact region, wherein the contact region comprises an open portion of a circuit and two spaced apart contact points that are exposed on an outer surface of the portable consumer device, the exposed contact points capable of being bridged by a finger, and wherein the trigger antenna is coupled to the two spaced apart contact points of the contact region and capable of enabling activation of the transmitting antenna;
placing the finger on the contact region; and
placing the portable consumer device near the interrogation device.

26. The method of claim 25 wherein the portable consumer device is placed within about 10 inches or less of the interrogation device.

27. A method for forming a portable consumer device comprising:
attaching a memory for storing financial information to a substrate;
forming a transmitting antenna on the substrate, wherein the near field transmitting antenna is coupled to the memory in the portable consumer device;
forming a contact region on the substrate, wherein the contact region is coupled to the transmitting antenna in the portable consumer device, wherein the contact region comprises an open portion of a circuit and two spaced apart contact points that are exposed on an outer surface of the portable consumer device, the exposed contact points capable of being bridged by a finger; and
forming a trigger antenna on the substrate, wherein the trigger antenna is coupled to the two spaced apart contact points of the contact region and capable of enabling activation of the transmitting antenna,
wherein the portable consumer device is capable of transmitting the stored information to an interrogation device using the transmitting antenna when the+ finger is on the contact region, but is not capable of transmitting the stored information to the interrogation device using the transmitting antenna when the finger is not on the contact region.

28. A method of providing secure wireless communication with an interrogation device, comprising:
providing an electronic device that comprises a memory for storing information, a transmitting antenna, a trigger antenna, and a contact region coupled to the transmitting antenna, wherein the contact region comprises an open portion of a circuit and two spaced apart contact points that are exposed on an outer surface of the electronic device, the exposed contact points capable of being bridged by a finger, and wherein the trigger antenna is coupled to the two spaced apart contact points of the contact region and capable of enabling activation of the transmitting antenna;
allowing a user to place the electronic device proximate to the interrogation device; and
configuring the electronic device to activate the transmitting antenna only when the user places the finger on the contact region while the electronic device is proximate to the interrogation device.

29. The method of claim 28, further comprising transmitting the information stored on the memory to the interrogation device when the transmitting antenna is activated.

30. The method of claim 28, further comprising configuring the electronic device to be interrogated by a radio frequency (RF) signal.

31. The method of claim 28, wherein the transmitting antenna is activated by inductive coupling.

* * * * *

UNITED STATES PATENT AND TRADEMARK OFFICE
CERTIFICATE OF CORRECTION

| | |
|---|---|
| PATENT NO. | : 8,505,826 B2 |
| APPLICATION NO. | : 11/735794 |
| DATED | : August 13, 2013 |
| INVENTOR(S) | : John Hachey |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this
Tenth Day of February, 2015

Michelle K. Lee
*Deputy Director of the United States Patent and Trademark Office*